March 9, 1937.     B. SANFORD     2,073,590
METHOD OF MAKING ABRASIVE WHEELS
Filed Feb. 19, 1935
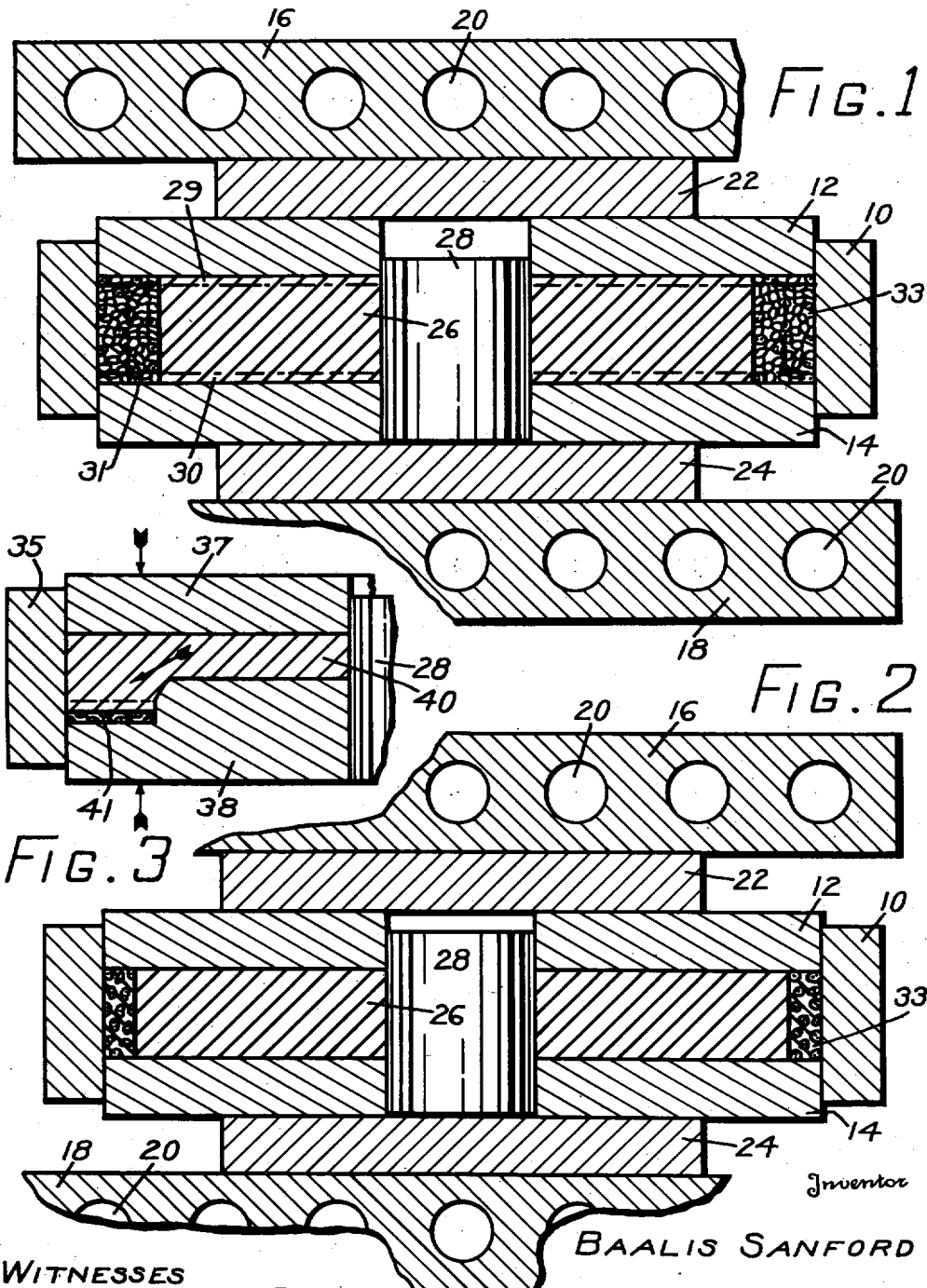
Inventor
BAALIS SANFORD
WITNESSES
Franklin E. Johnson
W R Greenwood
By Clayton R. Jenks
Attorney Patented Mar. 9, 1937

2,073,590

UNITED STATES PATENT OFFICE 2,073,590

METHOD OF MAKING ABRASIVE WHEELS

Baalis Sanford, Worcester, Mass., assignor to Norton Company, Worcester, Mass., a corporation of Massachusetts Application February 19, 1935, Serial No. 7,190

3 Claims. (Cl. 51—278)

This invention relates to abrasive wheels and more particularly to a method of making a grinding wheel having an annular abrasive rim composed of abrasive grains united together by a heat-settable bond and non-abrasive central supporting body formed of moldable material.

It has been proposed to make an abrasive wheel by molding a mixture of diamond grains and a resinoid bonding material on a preformed central body or core of a resinoid molding composition, such as a phenolic resinoid composition of the type known under the trade-mark "Bakelite". This core has previously been molded from the resinoid molding composition in powdered or granulated condition, with or without suitable fillers, to form an annular dense body, the outer diameter of which conforms substantially to that of the interior diameter of the abrasive rim. The preformed molded core is then laid over an arbor in a mold of the size desired for the wheel to be made, after which the loose abrasive mixture comprising the diamond particles and resinoid binder is packed by means of a hand implement uniformly around the periphery of the premolded core to fill the annular mold cavity formed between the mold sides and the outer peripheral face of the preformed center. Thereafter, the abrasive material thus packed is placed in a "hot press" and compressed by means of suitable annular pressure rings under conditions of high pressure and heat to mold the abrasive mixture into a dense compact mass upon the central core so as to unite the two portions integrally together to form a hard unitary body wherein the diamonds are united together by a hard infusible resinoid product.

This prior procedure, while it is entirely satisfactory for making many wheels of this type, is, however, found to involve several disadvantages. For example, in the use of this prior process, it is sometimes necessary to trim off the excess resinoid material from the side faces of the central support, as by a grinding or other suitable cutting operation, after the abrasive rim portion has been molded thereto, due to the compressibility and packing of the rim material to a smaller volume during the molding operation. This operation is found to involve a considerable waste of time and material and it appreciably contributes to the manufacturing expense of the article. It was furthermore found that this prior process was difficult to apply to the manufacture of cut-off wheels of extremely thin cross-section, that is, those which were thinner than ⅛", due to the mechanical conditions caused by the small dimensions desired. In such a case, trouble was also encountered during pressing of the abrasive mixture owing to mechanical difficulties of not only maintaining a perfect fit between the annular pressure rings and the respective mold parts but of keeping the ends of the rings closed so that it was hard to avoid a loss of a considerable quantity of the resinoid bonding material from the abrasive mix, while in a fluid condition during "hot pressing" of the mass, by leakage through the cracks between the ends of the rings during the molding process.

It is accordingly an object of my invention to overcome the disadvantages of the prior method and to provide an economical and efficient method of making an abrasive wheel of this type involving the use of a non-abrasive central supporting body of moldable material wherein the abrasive and non-abrasive sections may be simultaneously molded together by a simple pressing operation.

With this and other objects in view, as will be apparent from the following disclosure, my invention resides in the process steps set forth in the specification and covered by the claims appended hereto.

Referring to the drawing, which illustrates one type of apparatus employed in carrying out my invention and in which like reference numerals indicate like parts:

Fig. 1 is a fragmentary elevation in vertical section through the mold and its associated parts showing the material in the mold prior to molding and illustrating the method of molding a grinding wheel;

Fig. 2 is a view similar to Fig. 1 but showing the completed grinding wheel and the position of the apparatus after the molding operation has been completed; and Fig. 3 is a fragmentary diagrammatic view, in vertical section, through a mold and its associated parts showing a cup wheel made by this method.

In accordance with my invention, I propose to make a grinding wheel of this type by a method that will mold the abrasive body in situ with the central supporting core by allowing a part of the molding pressure which is applied vertically to the wheel material to be transmitted through the central core material and converted into a lateral hydraulic pressure when said core material is initially rendered plastic under heat. This causes the heated core material to flow radially and to compress the abrasive mixture in the rim portion outwardly and progressively with and during shrinkage thereof while the resinoid is being matured, and produce a hard, dense mass. In carrying out this molding procedure, I initially preform the central support of a suitable thermo-plastic moldable material into a central body having a volume the same as it will have in the final wheel support, but whose dimensions are so regulated as to allow room in the mold for packing the granular material comprising the rim portion between the core and the inner wall of the mold band. It is self-evident that any powdered or granular molding material, due to its loose form, will necessarily occupy a larger volume than if the same volume of solids were compacted into a dense solid mass. The dimensions of the preformed central supporting core are made such that the volume of material therein contained can change in shape when the material is compressed axially, and thus it will flow radially in the mold to exert lateral pressure against the sides of the abrasive rim material surrounding the core to cause side compression thereof, while it is also compressed vertically, so that when molding is completed it presents a wheel of the correct dimensions.

The essential feature of this invention is the development of plasticity in the material of the central support during molding. Thus, by supplying heat to the central body, plastic flow of the material thereof is developed which enables a portion of the vertically applied molding pressure to be uniformly and hydrostatically transmitted radially outwardly to thereby laterally compress the granular rim material into a hard dense mass.

As a specific embodiment of this invention, an abrasive wheel may be made in which the peripheral grinding body comprises granular abrasive material, such as diamond grains, boron carbide granules, grains of silicon carbide or crystalline alumina, the abrasive material being bonded into an integral structure by a thermo-plastic, heat-settable, moldable material, such as a resinoid, rubber, shellac and other well-known bonding materials. In practice, however, I prefer to unite the abrasive grains into a hard, integral body preferably by employing a resinoid bond of the heat-settable type, such as a phenolic resinoid which is of the fusible, potentially-reactive type, such as, for example, that known by the trade-mark "Bakelite" and obtained by the reaction of phenol and formaldehyde, or by that of their homologues. In this case, the bond is employed in a powdered or finely divided condition, with or without suitable inert fillers, and in such amounts as will be sufficient when matured to hold the abrasive grains together into a hard, integral mass of the density desired.

The central supporting body may be made of a thermo-plastic, heat-settable, organic molding material, and I preferably utilize for that purpose a substance which is capable of being molded and matured into a hard, solid and reasonably dense body of the desired shape. To this end, I may employ various molding materials for making the central supporting core, but I preferably use a phenolic resinoid molding composition of the type which is well known in the molding art, such as that known by the trade-mark "Bakelite", and essentially consisting of a phenol-formaldehyde resin binder with or without powdered or fibrous strengthening fillers or hardening agents incorporated therein. A measured quantity of this resinoid molding mixture is placed in a cylindrical mold of suitable dimensions and "hot molded" to the shape desired for the central support. However, the diameter and thickness of this molded center is so regulated as to provide a mold cavity of the exact volume which will permit it to be completely filled by the rim mixture when packed into position and ready to be molded. Thus, the diameter of the center is made slightly less than its final size, but an additional volume of molding material is incorporated in the width to increase its thickness in order that the volume content may be kept unchanged and which, upon being made plastic by being heated under pressure, will change its shape and flow radially to transmit a part of the vertical molding pressure radially against the sides of the rim mixture to supplement the vertical molding pressure to mold the material into a dense mass. In making this central support, the resinoid molding composition is hot molded into a compact, dense mass, while care is taken to prevent it from being reacted to an infusible condition so that the molded body will still be capable of becoming plastic and flowing under the subsequent application of heat and pressure. Also, the body is preferably compressed to a density equivalent to that at which it will be when completely cured and heat set.

Referring now to the drawing, Figs. 1 and 2 illustrate diagrammatically the assembly of the essential mold parts and apparatus associated therewith which may be employed to practice this improved method in which the mold may comprise an annular band 10 within which are inserted the top and bottom press plates 12 and 14, respectively, and between which is disposed the wheel material to be molded. The plates 12 and 14 are preferably made to closely fit the interior of the mold band 10 and they are relatively slidable therein and with respect to each other whereby they may serve to compact the material therebetween to the desired extent and shape. The mold plates 12 and 14 are arranged to be pressed from above and below by means of the usual press platens 16 and 18 of a conventional hot press (not shown). The platens 16 and 18 are suitably arranged for relative movement towards and from each other, as by means of hydraulic pressure, and each is provided with suitable channels 20 through which steam and cooling water may be alternately run to expedite the molding process to mature and heat-set the resinoid. Interposed between the top press plate 12 and the platen 16 is an intermediate plate 22, while positioned between the bottom press plate 14 and the platen 18 is also an intermediate plate 24, the plates 22 and 24 being slightly less in size than the diameter of the preformed center and utilized for the purpose of supplying heat thereto from the platens 16 and 18, respectively, to the central support to initially render it plastic and cause lateral flow thereof wherein a part of the molding pressure is transmitted therethrough and caused to exert a uniform side pressure against the abrasive mixture surrounding the central support to force the material together and consolidate it into a compact mass.

In order to make an abrasive wheel in accordance with this invention, the preformed central support 26, thus made, is positioned in the mold; an arbor 28 being inserted into the center hole of the support to prevent deformation thereof while under the molding pressure. As indicated in Fig. 1, the width of center 26 has been increased by the additional volume of material shown by the portions 29 and 30, respectively, but a consequent reduction in volume has been made in the diameter thereof, as shown therein, by the annular portion 31 whereby the total volume of the center remains constant but the body can change in shape during the molding operation in order to be squeezed radially and compressed into a solid unitary structure.

The mold cavity formed between the outer edge of the center support and the sides of the mold is now filled with a measured quantity of abrasive grains mixed with a resinoid bond, the mixture being suitably packed therein to fill the cavity to substantially the height of the top face of the central support. This mixture is made in accordance with standard knowledge, and if diamond grains are employed as the abrasive material, one may, for example, use 50 parts by volume of granular material with 50 parts by volume of a suitable resinoid bond. Suitable proportions will, of course, be employed to obtain the desired denseness and structure of this abrasive portion. Also, if desired, one may substitute grains of another abrasive material or granular inert material, such as silicon carbide, crystalline alumina, boron carbide or quartz, for a part of the diamond grains in the abrasive rim. Likewise, any one of these granular materials may be used by itself, or in mixtures with any of the others for this abrasive zone, it being understood that the abrasive nature of this outer rim will depend upon the type of material used, and that the invention is not limited to any particular abrasive substance.

In molding the wheel, the press platens 16 and 18 are now moved relatively toward each other and steam is permitted to circulate through the channels 20 formed within the platens. The central support 26 is first heated to the required temperature through the intermediate plates 22 and 24, respectively, the heat thus supplied being sufficient to first soften the resinoid of central support 26 and cause it to become plastic and flow; however, during this operation there has been no softening of the resinoid bond in the abrasive portion. By the further application of heat and uniform vertical pressure on the central body 26, the soft, plastic resinoid therein is caused to flow laterally and exert a great side pressure or force against the portion containing the abrasive mixture to consolidate the same. Further application of heat and pressure to the center support renders the resinoid in the rim portion plastic so that the side and top pressure applied thereto serves to compact it into a solid, dense mass, while the resinoid in the two sections is completely matured to present an integral unitary structure. If desired, cold water may thereafter be passed through the channels 20 to cool the matured resinoid.

It will now be understood that the shape of the grinding wheel is immaterial and that the invention is applicable to other forms of wheels, such as straight and tapered cup shapes in which the diamond annulus is arranged either on the flat side face of the cup only or in the side and peripheral faces. In making a straight shaped cup wheel, the supporting body is likewise preformed of the resinoid, with or without a suitable filler, to the required cup shape, and the diamond and bond is then compressed in a mold of suitable shape by pressure being applied in part through the cup-shaped supporting resinoid which is caused to flow under the heat and pressure, as is required to compress the abrasive annulus. It is preferable in these cases that the non-abrasive support be compacted to a dense body prior to the molding of the diamond annulus so that the supporting portion therefor will require the minimum of press platen movement to cause the material to flow and thus compress, by means of hydraulic pressure of the plastic resinoid, the loose diamond and resinoid material in contact therewith. Furthermore, in the case of the cup-shaped wheel, the hydrostatic flow of the plastic resinoid occurs both radially of the backing support and then axially of the wheel, as the diamond annulus is compressed to its desired shape. Thus, in a cup-shaped wheel, the diamond mixture is compressed from above solely by the pressure applied through the plastic medium. However, in molding a plain, disk-shaped wheel, as illustrated in the drawing, the flow of the resinoid material comprising the support is substantially radially of the mold, in which case the diamond annulus is compressed both by the direct, vertically applied pressure of the platens as well as the laterally applied force caused by the hydraulic flow of the plastic resinoid.

In performing the molding operation of a cup wheel, as illustrated in Fig. 3, a mixture of diamond and resinoid is compressed in a mold ring 35 by the top and bottom press plates 37 and 38. The molding pressure is applied to the wheel backing 40 in the direction indicated by the arrow axially of the mold to cause radial and axial flow of the resinoid material, as there indicated, to compress the diamond and resinoid material 41 into a dense, integral mass from its initial position therein, as shown in dot and dash outline.

In making the preformed central support, as shown in Figs. 1 and 2, it is not necessary to mold the resinoid composition to its maximum or final density. However, the central section is preferably preformed preliminary to molding the abrasive portion in order to avoid unnecessary press movement in compacting the material of the center to a dense condition before causing it to flow laterally. This wheel center may be made of a material which is not initially preformed to a molded shape, but must be first distributed in the mold and packed to a dense condition. That is, the consolidation of the center may take place at the time of molding of the abrasive annulus, but slightly in advance thereof so that the center material will be forced to flow laterally and aid in compacting the looser or less dense diamond and resinoid mass.

Having thus described my invention, what I claim as new and desire to secure by Letters Patent is:

1. The method of making an abrasive wheel having a resinoid core and a bonded abrasive rim comprising the steps of molding a preformed, dense central support therefor of greater thickness and smaller diameter than its final dimensions, the material thereof being identical in volume with its final volume and comprising a resinoid composition in a potentially-reactive condition and compressed to substantially its final density, positioning the preformed support in the center of a mold of the dimensions of the wheel desired, depositing a mixture of abrasive grains and potentially-reactive, thermo-setting resinoid in the mold against and surrounding the peripheral face of the central support, heating and simultaneously pressing both the resinoid support and said mixture in the mold and casing the resinoid material of the support to flow radially outwardly toward the rim portion and hydrostatically apply lateral pressure to the abrasive mixture therein while it is being compacted vertically, and thereafter heat setting the material in the mold to convert and mature the resinoids and form an integral wheel structure.

2. The method of making an abrasive wheel comprising the steps of first shaping and compressing to substantially its final density, a central core of a heat settable plastic body, placing around the core in a mold having a press plate a mixture of moldable abrasive material and a heat settable bond, applying pressure simultaneously by means of said plate to both the core and the abrasive and bond mixture and causing the core to flow laterally and hydrostatically compress the abrasive rim without materially altering the final volume of the core and thereafter heat setting the core and bond and forming an integral body thereof.

3. The method of making an abrasive wheel comprising the steps of shaping and compressing a potentially reactive, thermo-setting resinoid at a temperature which will not cause the resinoid to react and thereby providing a plastic core having substantially its final volume, thereafter directly compressing a mixture of abrasive grains and a potentially reactive thermo-setting resinoid bond in contact with an annular surface of the core while located in a confining mold, simultaneously pressing the core directly and causing it to flow within the mold and hydrostatically apply pressure against the abrasive mixture and thereby compact the latter into an integral union with the core, and thereafter heat setting all of the resinoid materials to a reacted and permanently set, infusible condition.

BAALIS SANFORD.

CERTIFICATE OF CORRECTION.

Patent No. 2,073,590.     March 9, 1937.

BAALIS SANFORD.

It is hereby certified that error appears in the printed specification of the above numbered patent requiring correction as follows: Page 3, second column, line 74, claim 1, for the word "casing" read causing; and that the said Letters Patent should be read with this correction therein that the same may conform to the record of the case in the Patent Office.

Signed and sealed this 6th day of April, A. D. 1937.

(Seal)                      Henry Van Arsdale
Acting Commissioner of Patents.

dially outwardly toward the rim portion and hydrostatically apply lateral pressure to the abrasive mixture therein while it is being compacted vertically, and thereafter heat setting the material in the mold to convert and mature the resinoids and form an integral wheel structure.

2. The method of making an abrasive wheel comprising the steps of first shaping and compressing to substantially its final density, a central core of a heat settable plastic body, placing around the core in a mold having a press plate a mixture of moldable abrasive material and a heat settable bond, applying pressure simultaneously by means of said plate to both the core and the abrasive and bond mixture and causing the core to flow laterally and hydrostatically compress the abrasive rim without materially altering the final volume of the core and thereafter heat setting the core and bond and forming an integral body thereof.

3. The method of making an abrasive wheel comprising the steps of shaping and compressing a potentially reactive, thermo-setting resinoid at a temperature which will not cause the resinoid to react and thereby providing a plastic core having substantially its final volume, thereafter directly compressing a mixture of abrasive grains and a potentially reactive thermo-setting resinoid bond in contact with an annular surface of the core while located in a confining mold, simultaneously pressing the core directly and causing it to flow within the mold and hydrostatically apply pressure against the abrasive mixture and thereby compact the latter into an integral union with the core, and thereafter heat setting all of the resinoid materials to a reacted and permanently set, infusible condition.

BAALIS SANFORD.

CERTIFICATE OF CORRECTION.

Patent No. 2,073,590.     March 9, 1937.

BAALIS SANFORD.

It is hereby certified that error appears in the printed specification of the above numbered patent requiring correction as follows: Page 3, second column, line 74, claim 1, for the word "casing" read causing; and that the said Letters Patent should be read with this correction therein that the same may conform to the record of the case in the Patent Office.

Signed and sealed this 6th day of April, A. D. 1937.

(Seal)                          Henry Van Arsdale
                                  Acting Commissioner of Patents.

CERTIFICATE OF CORRECTION.

Patent No. 2,073,590.

March 9, 1937

BAALIS SANFORD.

It is hereby certified that error appears in the printed specification of the above numbered patent requiring correction as follows: Page 3, second column, line 74, claim 1, for the word "casing" read causing; and that the said Letters Patent should be read with this correction therein that the same may conform to the record of the case in the Patent Office.

Signed and sealed this 6th day of April, A. D. 1937.

(Seal)

Henry Van Arsdale
Acting Commissioner of Patents.